US012801445B2

(12) United States Patent
Comer et al.

(10) Patent No.: US 12,801,445 B2
(45) Date of Patent: Nov. 17, 2026

(54) SYSTEMS AND METHODS FOR GLOBAL DATA SHARING ACROSS CONTAINERS

(71) Applicant: Dell Products L.P., Round Rock, TX (US)

(72) Inventors: Ryan N. Comer, Round Rock, TX (US); Anantha K. Boyapalle, Cedar Park, TX (US); Marc R. Hammons, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 18/396,869

(22) Filed: Dec. 27, 2023

(65) Prior Publication Data

US 2025/0217201 A1 Jul. 3, 2025

(51) Int. Cl.
*G06F 9/46* (2006.01)
*G06F 9/50* (2006.01)

(52) U.S. Cl.
CPC .................................... *G06F 9/505* (2013.01)

(58) Field of Classification Search
CPC ...................................................... G06F 9/505
See application file for complete search history.

(56) References Cited

U.S. PATENT DOCUMENTS

2022/0035646 A1* 2/2022 Ibryam ............... G06F 9/44505
2022/0391494 A1* 12/2022 Yang .................. G06F 21/6209

* cited by examiner

*Primary Examiner* — Gregory A Kessler
(74) *Attorney, Agent, or Firm* — Jackson Walker L.L.P.

(57) ABSTRACT

An information handling system comprising may include a processor and a data orchestrator comprising a program of instructions configured to, when read and executed by the processor, in a distributed ecosystem comprising a plurality of host systems including a first host system and a second host system: receive a request from a first workload container executing on the first host system and associated with a user session; determine if the request requires a data context of a second workload container executing on the second host system and associated with the user session; and if the request requires a data context of a second workload container executing on the second host system, couple a stream of data associated with the data context from the second workload container and the first workload container.

15 Claims, 3 Drawing Sheets

SYSTEMS AND METHODS FOR GLOBAL DATA SHARING ACROSS CONTAINERS

TECHNICAL FIELD

The present disclosure relates in general to information handling systems, and more particularly to methods and systems for global sharing of data across multiple containers in a distributed ecosystem.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a distributed computing system, the ecosystem may have a plurality of distributed computing endpoints, each endpoint capable of instantiating containers for executing workloads.

Because workloads are containerized, they may be isolated from one another. In some instances, such isolation may cause some inter-workload functions to operate incorrectly, or not at all. Some examples of inter-workload functionality may include drag-and-drop, copy-paste, and screen/window sharing between containers. Users expect such functionality to work correctly as they would in a non-distributed system, and a distributed system without such features may provide a negative user experience.

SUMMARY

In accordance with the teachings of the present disclosure, the disadvantages and problems associated with existing approaches to workload distribution may be reduced or eliminated.

In accordance with embodiments of the present disclosure, an information handling system comprising may include a processor and a data orchestrator comprising a program of instructions configured to, when read and executed by the processor, in a distributed ecosystem comprising a plurality of host systems including a first host system and a second host system: receive a request from a first workload container executing on the first host system and associated with a user session; determine if the request requires a data context of a second workload container executing on the second host system and associated with the user session; and if the request requires a data context of a second workload container executing on the second host system, couple a stream of data associated with the data context from the second workload container and the first workload container.

In accordance with these and other embodiments of the present disclosure, a method may include, in a distributed ecosystem comprising a plurality of host systems including a first host system and a second host system: receiving a request from a first workload container executing on the first host system and associated with a user session; determining if the request requires a data context of a second workload container executing on the second host system and associated with the user session; and if the request requires a data context of a second workload container executing on the second host system, coupling a stream of data associated with the data context from the second workload container and the first workload container.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a distributed ecosystem comprising a plurality of host systems including a first host system and a second host system: receive a request from a first workload container executing on the first host system and associated with a user session; determine if the request requires a data context of a second workload container executing on the second host system and associated with the user session; and if the request requires a data context of a second workload container executing on the second host system, couple a stream of data associated with the data context from the second workload container and the first workload container.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
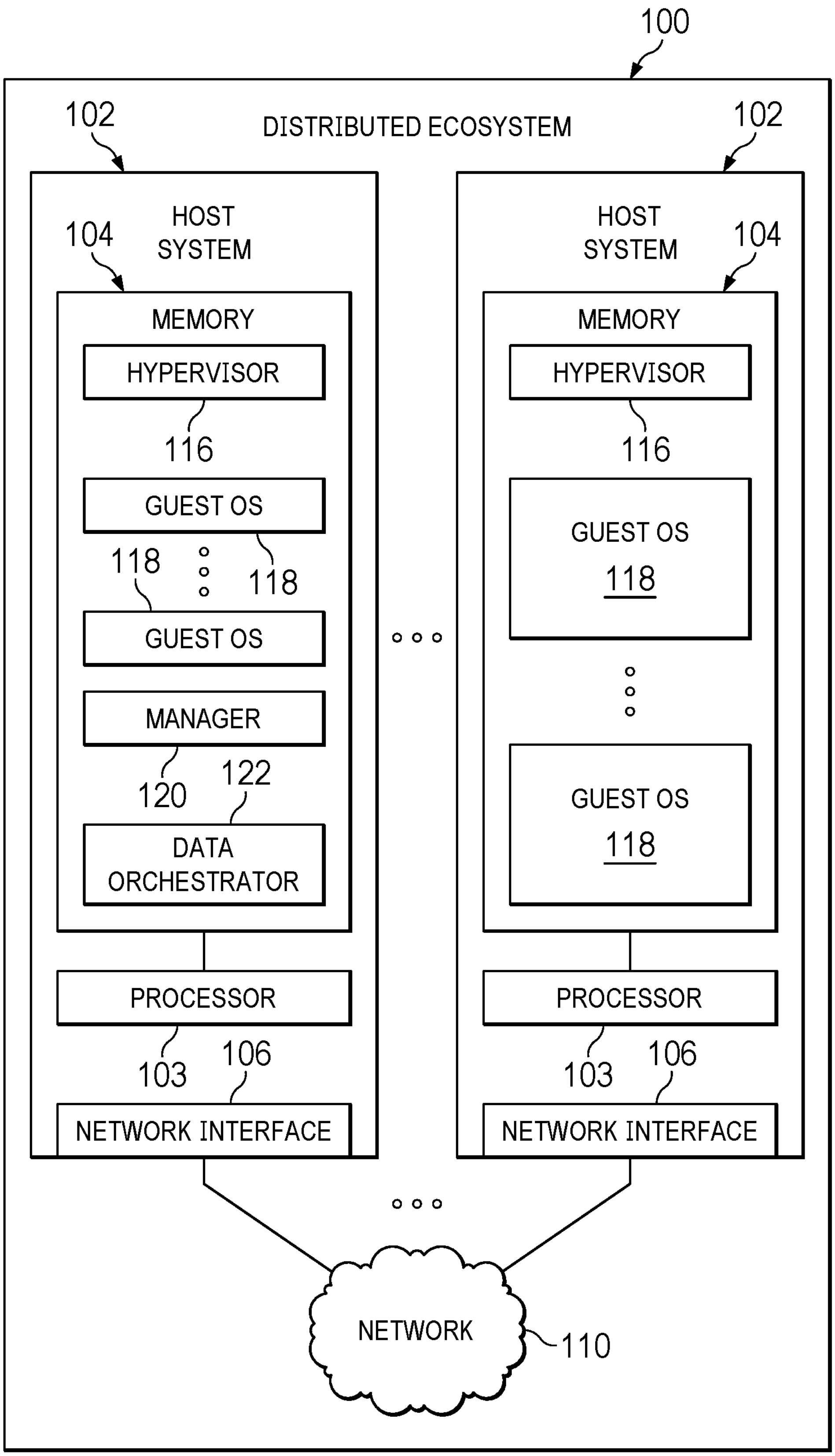
FIG. 1 illustrates a block diagram of selected components of an example distributed ecosystem, in accordance with embodiments of the present disclosure.
Figure 2:
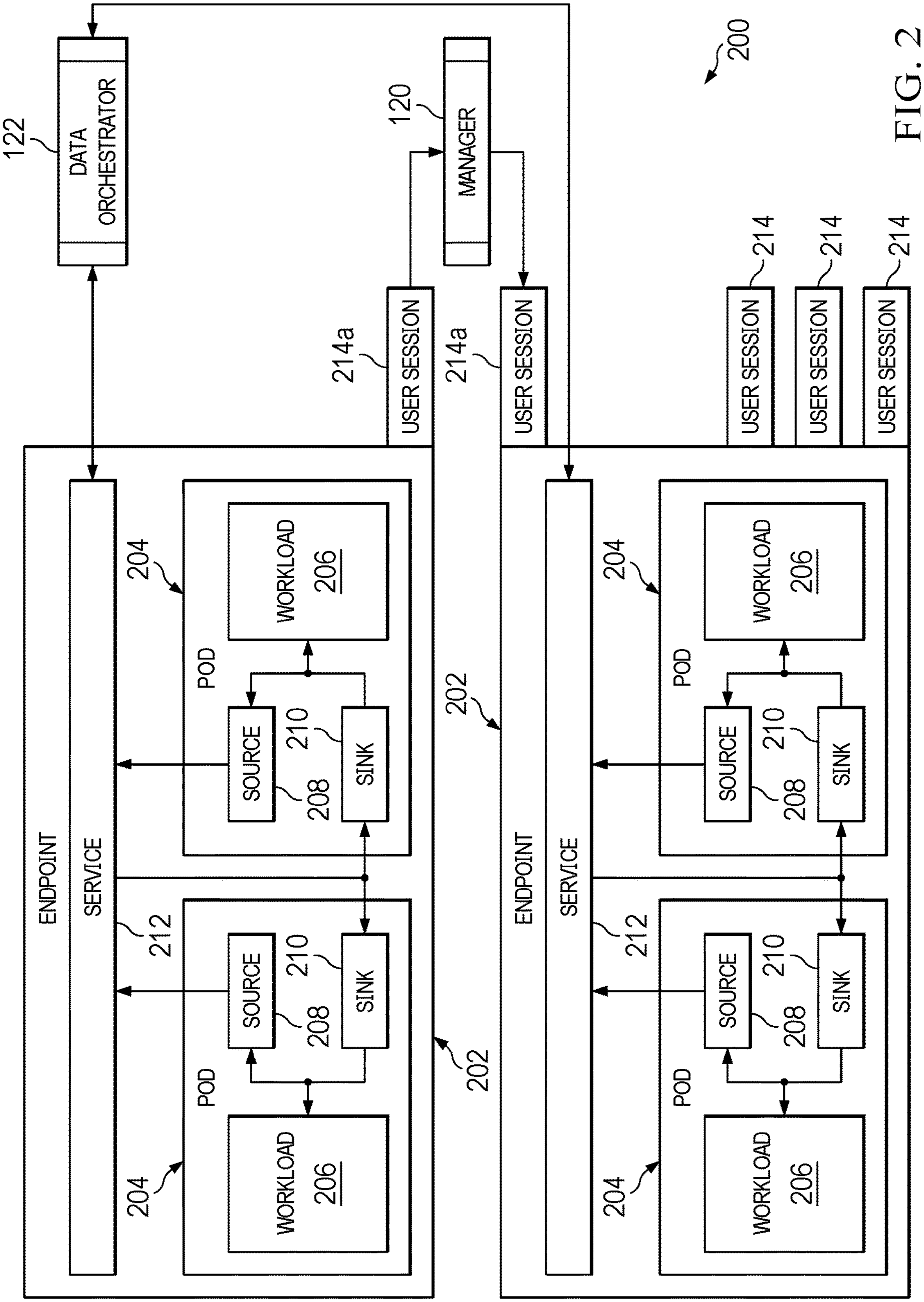
FIG. 2 illustrates a block diagram of an architecture for global data sharing across containers in a distributed ecosystem, in accordance with embodiments of the present disclosure.
Figure 3:
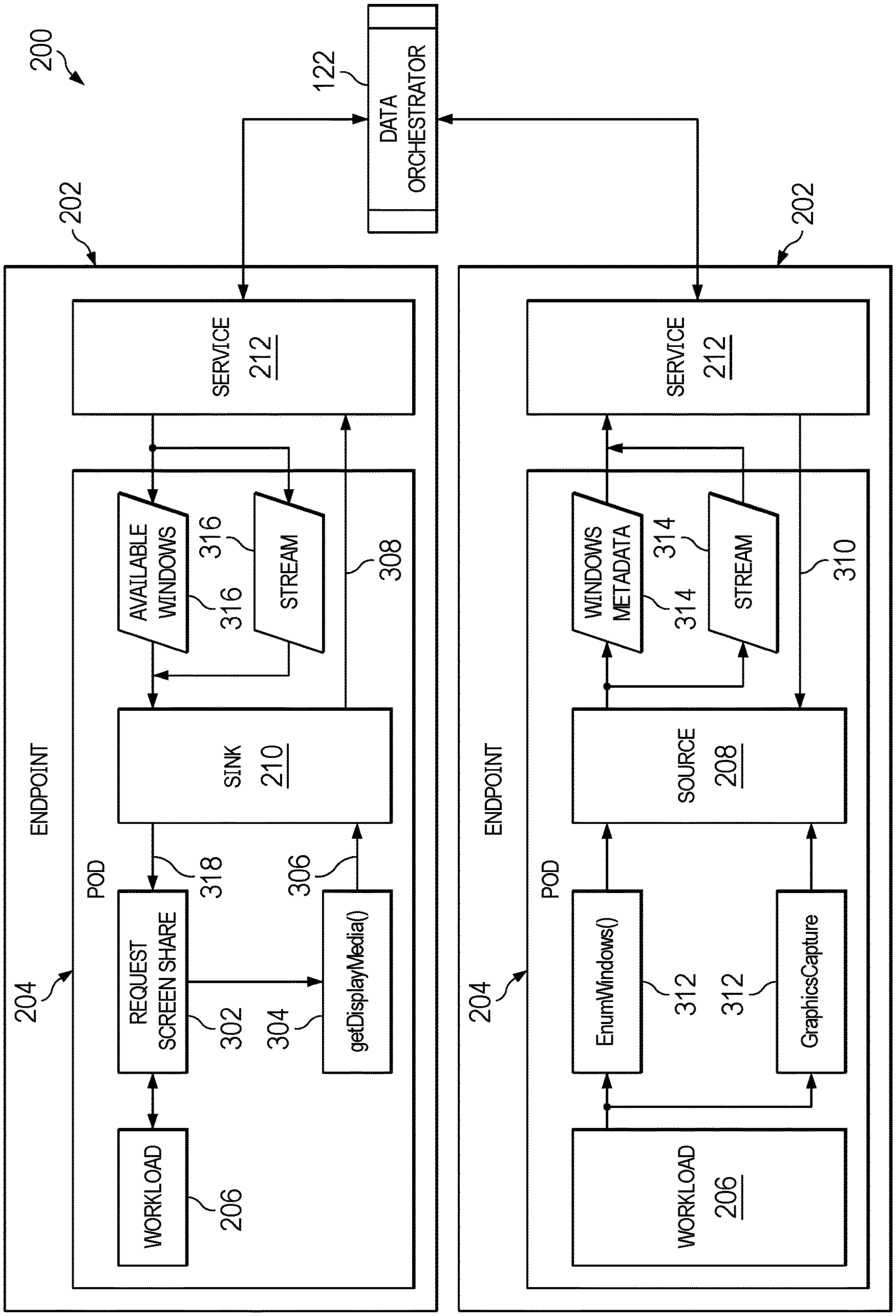
FIG. 3 illustrates a block diagram of the architecture for global data sharing depicted in FIG. 2, annotated to describe an example application of data sharing within the architecture, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically distributed ecosystem 100 erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of selected components of an example distributed ecosystem 100 having a plurality of host systems 102, in accordance with embodiments of the present disclosure. As shown in FIG. 1, distributed ecosystem 100 may include a plurality of host systems 102 coupled to one another via a network 110. In some embodiments, two or more of the plurality of host systems 102 may be co-located in the same geographic location (e.g., building or data center). In these and other embodiments, two or more of the plurality of host systems 102 may be co-located in the enclosure, rack, or chassis. In these and other embodiments, two or more of the plurality of host systems 102 may be located in substantially different geographic locations.

A host system 102 may comprise an information handling system. In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, host system 102 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

As used herein, a host system 102 may sometimes be referred to as an "endpoint" of distributed ecosystem 100.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to host system 102 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103.

A hypervisor 116 may comprise software and/or firmware generally operable to allow multiple virtual machines and/or operating systems to run on a single computing system (e.g., an host system 102) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE'S ESX SERVER, L4 MICROKERNEL, TRANGO, MICROSOFT'S HYPER-V, SUN'S LOGICAL DOMAINS, HITACHI'S VIRTAGE, KVM, VMWARE SERVER, VMWARE WORKSTATION, VMWARE FUSION, QEMU, MICROSOFT'S VIRTUAL PC and VIRTUAL SERVER, INNOTEK'S VIRTUALBOX, and SWSOFT'S PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

As used herein, a guest OS 118 or virtual machine may sometimes be referred to herein as a "container" of distributed ecosystem 100.

At least one host system 102 in system 100 may have stored within its memory 104 a manager 120. A manager 120 may comprise software and/or firmware generally operable to manage individual hypervisors 116 and the guest OSes 118 instantiated on each hypervisor 116, including controlling migration of guest OSes 118 between hypervisors 116. Further, as described in greater detail below, a manager 120 may perform session management to maintain mappings of user sessions across endpoints/guest OSes 118.

At least one host system 102 in system 100 may have stored within its memory 104 a data orchestrator 122. As described in greater detail below, a data orchestrator 122 may comprise software and/or firmware generally operable to orchestrate shared data of a user session across endpoints/guest OSes 118.

A network interface 106 may include any suitable system, apparatus, or device operable to serve as an interface between an associated host system 102 and network 110. A network interface 106 may enable its associated host system 102 to communicate with network 110 using any suitable transmission protocol (e.g., TCP/IP) and/or standard (e.g., IEEE 802.11, Wi-Fi). In certain embodiments, a network interface 106 may include a physical network interface controller (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable network interface cards, including without limitation, mezzanine cards, network daughter cards, etc.

Network 110 may be a network and/or fabric configured to communicatively couple information handling systems to each other. In certain embodiments, network 110 may include a communication infrastructure, which provides physical connections, and a management layer, which organizes the physical connections of host systems 102 and other devices coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Fibre Channel over Ethernet (FCOE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

In addition to processor 103, memory 104, and network interface 106, a host system 102 may include one or more other information handling resources.

FIG. 2 illustrates a block diagram of an architecture 200 for global data sharing across containers in a distributed ecosystem, in accordance with embodiments of the present disclosure. As shown in FIG. 2, architecture 200 may be implemented using a plurality of endpoints 202, wherein each endpoint may be implemented by a host system 102. Although, for purposes of clarity and exposition, FIG. 2 depicts only two endpoints 202 present in architecture 200, it is understood that a distributed ecosystem 100 and/or architecture 200 may include any suitable number of endpoints 202.

As also depicted in FIG. 2, a plurality of user sessions 214 may be instantiated on endpoints 202, including a user session **214*a* instantiated on both endpoints 202 shown in FIG. 2, such that user session 214*a* utilizes processing resources and data present on both endpoints 202**.

As further shown in FIG. 2, when a workload is placed on an endpoint 202, a service 212 of a hypervisor 116 may instantiate a pod 204 for such workload, wherein such pod 204 may comprise a workload container 206, a source container 208, and a sink container 210.

A workload container 206 may be implemented by a guest OS 118, and may be a container configured to execute a particular workload (e.g., execution of an application program or other task) in connection with a user session 214. A source container 208 may be implemented by a different guest OS 118, and may be a specialized sidecar container configured to capture data context from its associated workload container 206. Similarly, a sink container 210 may be implemented by an additional different guest OS 118, and may be a specialized sidecar container configured to inject shared data context (i.e., from another workload container 206) into its associated workload container.

Data orchestrator 122 (which may or may not be implemented on a host system 102 other than the host systems 102 implementing endpoints 202) may communicate (e.g., via services 212 executing on hypervisors 116 of endpoints 202) with source containers 208 and sink containers 210 for each workload container 206 across distributed ecosystem 100 to determine when data context needs to be shared between workload containers 106. For example, if an incoming data stream from a sink container 210 associated with a first workload container 206 indicates that additional data context is required from a second workload container 206, then data orchestrator 122 may couple the data stream from the source container 208 associated with the second workload container 206 to the sink container 210 associated with the first workload container 206. Accordingly, the systems and methods described above enable the capture, transmission, and injection of shared data context between containerized workloads to enable the inter-workload use cases described in the Background section.

FIG. 3 illustrates a block diagram of the architecture for global data sharing depicted in FIG. 2, annotated to describe an example application of data sharing within the architecture, in accordance with embodiments of the present disclosure. In FIG. 3, for purposes of clarity and exposition, some of the components depicted in FIG. 2 have been removed, and some additional annotations and features not shown in FIG. 2 have been added.

In particular, FIG. 3 depicts global data sharing in a situation in which a first workload container 206 on a first endpoint 202 may comprise a video conferencing application for which a user may desire to share, with other participants in a video conference, a graphical user interface window of an application executing on a second workload container 206 of a second endpoint 202.

Accordingly, at step 302, a user of the video conferencing application executing in first workload container 206 may request (e.g., via the video conferencing application's user interface) that a user interface window associated with the user session be shared with other conference participants. In response, at step 304, the video conferencing application may call a function (e.g., "getDisplayMedia ( )") to acquire the available user interface windows of the user session. At step 306, sink container 210 associated with the first workload container 206 may detect the function call and determine that it needs to find the current user interface windows associated with the user session.

Accordingly, at step 308, sink container 210 associated with the first workload container 206 may notify data orchestrator 122 (e.g., via service 212 of the first endpoint 202) that it desires the active windows of the user session. In response, at step 310, data orchestrator 122 may communicate out to source containers 208 of endpoints 202 having workloads associated with the user session to request the desired data context.

At step 312, source containers 208 of endpoints 202 having workloads associated with the user session may execute a function (e.g., "EnumWindows ( )") to enumerate the user session's active windows and acquire window metadata for all such windows and/or execute a function (e.g., "GraphicsCapture") to create a video stream of active windows. At step 314, the source containers 208 may communicate the data context (e.g., window metadata and/or video stream) back to data orchestrator 122. At step 316, data orchestrator 122 may communicate the data context (e.g., window metadata and/or video stream) to the sink container 210 associated with the first workload container 206. Finally, at step 318, the sink container 210 associated with the first workload container 206 may return the data context (e.g., window metadata and/or video stream) to the requesting application executing within the first workload container 206.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:

a processor; and a data orchestrator comprising a program of instructions configured to, when read and executed by the processor, in a distributed ecosystem comprising a plurality of host systems including a first host system and a second host system:

receive a request from a first workload container executing on the first host system and associated with a user session;

determine if the request requires a data context of a second workload container executing on the second host system and associated with the user session; and if the request requires a data context of a second workload container executing on the second host system, couple a stream of data associated with the data context from the second workload container and the first workload container, wherein coupling the stream of data comprises capturing, by the data orchestrator, runtime data context generated by the second workload container as the second workload container executes and injecting the captured runtime data context into the first workload container.

2. The information handling system of claim 1, wherein the request from the first workload container is received via a sidecar sink container executing on the first host system.

3. The information handling system of claim 2, wherein the sidecar sink container and the first workload container are integral to a pod of containers such that the sidecar sink container is dedicated to the first workload container.

4. The information handling system of claim 2, wherein coupling the stream of data comprises coupling the second workload container to the first workload container via a sidecar source container executing on the second host system and via the sidecar sink container.

5. The information handling system of claim 4, wherein the sidecar source container and the second workload container are integral to a pod of containers such that the sidecar source container is dedicated to the second workload container.

6. A method comprising, in a distributed ecosystem comprising a plurality of host systems including a first host system and a second host system:

receiving a request from a first workload container executing on the first host system and associated with a user session;

determining whether the request requires a data context of a second workload container executing on the second host system and associated with the user session; and responsive to determining that the request requires a data context of a second workload container executing on the second host system, coupling a stream of data associated with the data context from the second workload container and the first workload container, wherein coupling the stream of data comprises capturing runtime data context generated by the second workload container as the second workload container executes and injecting the captured runtime data context into the first workload container.

7. The method of claim 6, wherein the request from the first workload container is received via a sidecar sink container executing on the first host system.

8. The method of claim 7, wherein the sidecar sink container and the first workload container are integral to a pod of containers such that the sidecar sink container is dedicated to the first workload container.

9. The method of claim 7, wherein coupling the stream of data comprises coupling the second workload container to the first workload container via a sidecar source container executing on the second host system and via the sidecar sink container.

10. The method of claim 9, wherein the sidecar source container and the second workload container are integral to a pod of containers such that the sidecar source container is dedicated to the second workload container.

11. An article of manufacture comprising:

a non-transitory computer-readable medium; and computer-executable instructions carried on the computer-readable medium, the instructions readable by a processor, the instructions, when read and executed, for causing the processor to, in a distributed ecosystem comprising a plurality of host systems including a first host system and a second host system:

receive a request from a first workload container executing on the first host system and associated with a user session;

determine if the request requires a data context of a second workload container executing on the second host system and associated with the user session; and if the request requires a data context of a second workload container executing on the second host system, couple a stream of data associated with the data context from the second workload container and the first workload container, wherein coupling the stream of data comprises capturing runtime data context generated by the second workload container as the second workload container executes and injecting the captured runtime data context into the first workload container.

12. The article of claim 11, wherein the request from the first workload container is received via a sidecar sink container executing on the first host system.

13. The article of claim 12, wherein the sidecar sink container and the first workload container are integral to a pod of containers such that the sidecar sink container is dedicated to the first workload container.

14. The article of claim 12, wherein coupling the stream of data comprises coupling the second workload container to the first workload container via a sidecar source container executing on the second host system and via the sidecar sink container.

15. The article of claim 14, wherein the sidecar source container and the second workload container are integral to a pod of containers such that the sidecar source container is dedicated to the second workload container.

* * * * *